United States Patent [19]

Sumiya

[11] Patent Number: 4,462,279
[45] Date of Patent: Jul. 31, 1984

[54] 1-2 SHIFT VALVE FOR AN AUTOMATIC TRANSMISSION

[75] Inventor: Koji Sumiya, Aichi, Japan

[73] Assignee: Aisin Warner Kabushiki Kaisha, Aichi, Japan

[21] Appl. No.: 339,808

[22] Filed: Jan. 15, 1982

[30] Foreign Application Priority Data

Jan. 19, 1981 [JP] Japan .................................. 56-6846

[51] Int. Cl.$^3$ ...................... B60K 41/04; B60K 41/12
[52] U.S. Cl. ........................................ 74/868; 74/867
[58] Field of Search ................ 74/867, 868, 869, 870; 137/596.18, 625.66

[56] References Cited

U.S. PATENT DOCUMENTS

| 1,030,466 | 6/1912 | Gilman | 137/625.66 |
| 2,857,780 | 10/1958 | Ball et al. | 74/870 |
| 3,611,838 | 10/1971 | Utter | 74/868 |
| 3,774,629 | 11/1973 | Enomoto | 74/867 |
| 3,949,627 | 4/1976 | Murakami | 74/867 |
| 3,951,011 | 4/1976 | Lemon | 74/867 |
| 4,139,015 | 2/1979 | Sakai | 74/867 |
| 4,161,895 | 7/1979 | Ushijima et al. | 74/867 |
| 4,296,651 | 10/1981 | Iwanaga et al. | 74/867 |

Primary Examiner—Lawrence J. Staab
Assistant Examiner—Bruce F. Wojciechowski
Attorney, Agent, or Firm—Blum Kaplan Friedman Silberman & Beran

[57] ABSTRACT

The shift valve operates in response to a governor pressure counteracting a throttle pressure and in response to a detent pressure used in a kickdown operation. The valve is capable of shifting up from a first speed range to a second speed range as well as shifting down from second speed to the first speed under control of the shift valve. The 1-2 shift valve comprises a spool having a pressure bearing surface adapted to receive either the throttle pressure or the detent pressure. In the first speed position, the spool closes off the detent line pressure and receives the throttle pressure on the pressure bearing surface. On the other hand, at the second speed position, the spool closes off the throttle pressure line and receives the detent pressure on the pressure bearing surface. In the down-shift position, the governor pressure corresponding to vehicle speed and the throttle pressure corresponding to a spring force and a throttle opening, are applied to the spool in opposition so that the spool is moved in accordance with a relationship between the governor pressure, spring force and throttle pressure.

28 Claims, 4 Drawing Figures

1-2 SHIFT VALVE FOR AN AUTOMATIC TRANSMISSION

BACKGROUND OF THE INVENTION

This invention relates generally to a vehicle automatic transmission and more particularly to a 1-2 shift valve operating in response to a governor pressure counteracting a throttle pressure, and in response to a detent pressure used in a kick-down operation. In a 1-2 shift valve of the prior art, detent pressure, throttle pressure and governor pressure are each applied through different passages. Throttle pressure is applied by way of a ball check valve and changeover between application of the throttle pressure and the detent pressure is effected by the ball of the check valve. However, the performance of the check ball is not sufficiently reliable and adequate sealing of the valve is not achieved. Furthermore, the construction of the conventional 1-2 shift valve is costly. Additionally, the spool of the conventional 1-2 shift valve is difficult to fabricate, has an unavoidably high material cost, and is likely to slide irregularly once assembled because it comprises a single element having a plurality of lands of different areas.

Further, even if the spool of the 1-2 shift valve is fabricated from two discrete component spools, each spool component having lands of the same areas as the one piece spool, only the fabricating procedure, cost and reliability of operation are improved. However, it is unavoidable in the conventional spool of the prior art that the contours of each component spool are not bilateral along the axis of the spool, that is, symmetrical end for end, and this is likely to cause faulty assembly resulting in a malfunction of the valve.

What is needed is a 1-2 shift valve for an automatic transmission having a spool fabricated of independent components and operating without the use of any ball check valve.

SUMMARY OF THE INVENTION

Generally speaking, in accordance with the invention, a 1-2 shift valve for an automatic transmission of a vehicle especially suitable for reliable operation and for simplified fabrication and assembly procedures is provided. The shift valve operates in response to a governor pressure counteracting a throttle pressure and in response to a detent pressure used in a kickdown operation. The valve is capable of shifting up from a first speed range to a second speed range as well as shifting down from second speed to the first speed under control of the shift valve. The 1-2 shift valve for an automatic transmission comprises a spool having a pressure bearing surface adapted to receive either the throttle pressure or the detent pressure. In the first speed position, the spool closes off the detent line pressure and receives the throttle pressure on the pressure bearing surface. On the other hand, at the second speed position, the spool closes off the throttle pressure line and receives the detent pressure on the pressure bearing surface. In the down-shift position, the governor pressure corresponding to vehicle speed and the throttle pressure corresponding to a spring force and a throttle opening, are applied to the spool in opposition so that the spool is moved in accordance with a relationship between the governor pressure, spring force and throttle pressure.

With the spool position at the up-shift position, the governor pressure and the spring force, or the spring force and a detent pressure, that is, a kickdown signal pressure, are applied to the spool in opposition so that the spool moves correspondingly. With the spool at its down-shift position, application of oil pressure to a frictional engagement element for providing the second speed, is interrupted to select the first speed. On the other hand, with the spool position at its up-shift position, oil pressure is applied to the frictional engagement element for providing the second speed so that the second speed is selected.

Accordingly, it is an object of this invention to provide an improved 1-2 shift valve for an automatic transmission for a vehicle which effectively operates without including a ball check valve.

Another object of this invention is to provide an improved 1-2 shift valve for an automatic transmission for a vehicle including at least two spool elements, each spool element being symmetrical end for end along its longitudinal axis.

A further object of this invention is to provide an improved 1-2 shift valve for an automatic transmission for a vehicle which is produced at reduced cost and provides reliable performance.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

This invention relates to the improvement of a 1-2 shift valve used in the hydraulic control circuit of an automatic transmission. The 1-2 shift valve of the invention is capable of selecting the first speed in a down-shift state and selecting a second speed in an up-shift state.

The 1-2 shift valve comprises a housing, that is, valve body, and a spool slidably fitted in the housing. With the spool positioned at the down-shift position, a governor pressure corresponding to the vehicle speed and a throttle pressure corresponding to a spring force and a throttle opening are applied oppositely to the spool so that the spool is moved in accordance with a relationship between the governor pressure, the spring force and the throttle pressure.

With the spool position at the up-shift position, the governor pressure and spring force, or the spring force and a detent pressure, that is, a kick-down signal pressure, are applied oppositely to the spool so that the spool moves correspondingly. When the spool is positioned for the down-shift, application in the transmission of oil pressure to a frictional engagement element for providing the second speed is interrupted to select the first speed. On the other hand, with the spool positioned at the up-shift position, oil pressure is applied in the transmission to the frictional engagement element for providing the second speed so that the second speed is selected.

Figure 1:
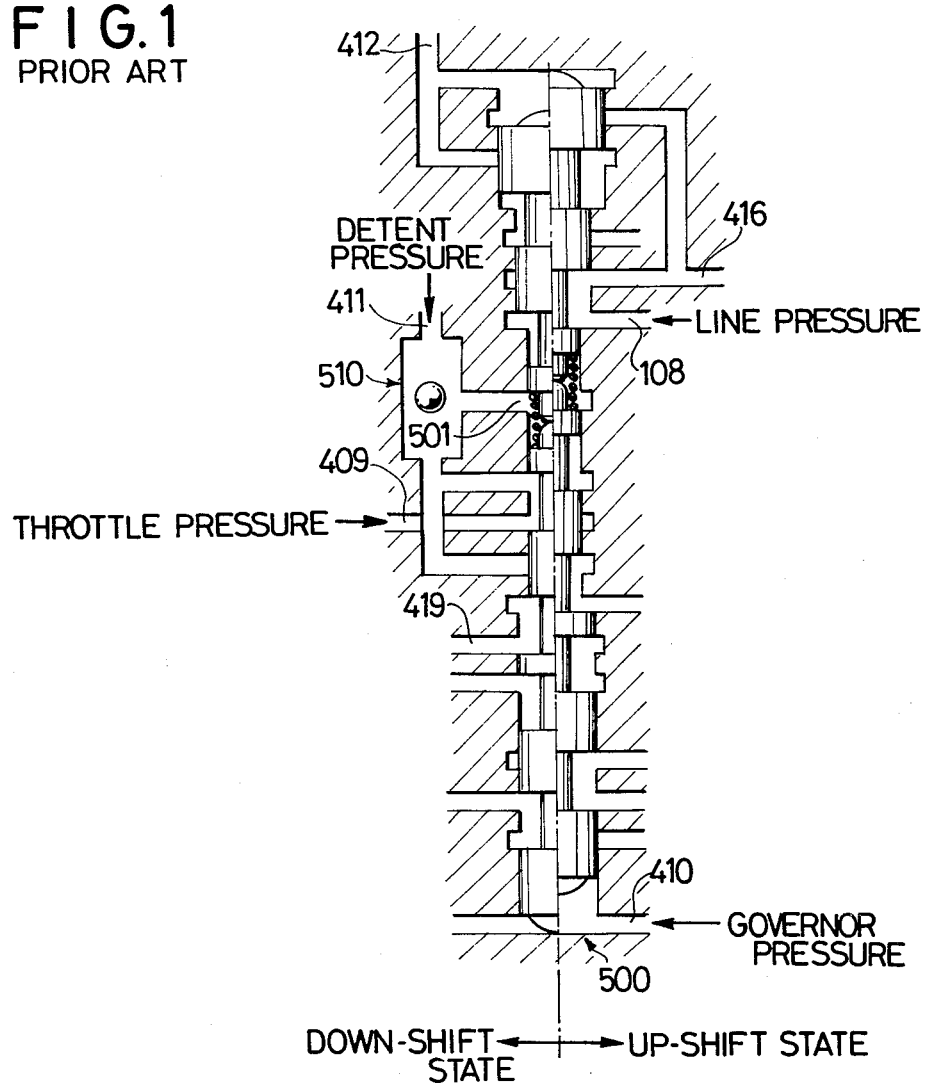
FIG. 1 is a sectional view through the longitudinal axis of a 1-2 shift valve for an automatic transmission of the prior art.

FIG. 1 illustrates a 1-2 shift valve 500 of the prior art in which a detent pressure is applied to a passage 411 while at the same time the throttle pressure is applied to a passage 409. Also, the governor pressure is applied to a passage 410. With the spool positioned at its down position as shown by the left half of the drawing (FIG. 1), the throttle pressure is applied to a ball check valve 510 through the passage 409 such that the passage 411 is shut off by the ball. Thereby, the throttle pressure is applied to a port 501.

Note that the spool in FIG. 1 is illustrated split along the longitudinal axis so that its position is shown on one side of the center line for the down-shift state and on the other side of the center line for the up-shift state.

With the spool in the up-shift position as shown on the right-side of the center line (FIG. 1), the passage 409 is closed off, so that detent pressure applied to the ball check valve 510 is applied to the port 501 through the passage 411 in a kick-down operation.

Thus, the conventional 1-2 shift valve for an automatic transmission employs a check ball valve in changing over between the application to the shift valve of the throttle pressure and the detent pressure. However, functioning of the ball check valve is not adequately reliable and sufficient sealing of the valve cannot be achieved. Furthermore, the prior art 1-2 shift valve is costly. Additionally, the spool of the prior art 1-2 shift valve is difficult to fabricate, has unavoidably higher material costs, and the spool is likely to slide irregularly in the housing because it is comprised of a single element having a large plurality of lands of many different areas.

Even if the spool of the prior art 1-2 shift valve is fabricated in two discrete components each having lands of the same areas as the one piece construction, only the fabricating procedure, cost and reliability of operation are improved to a degree. However, it is unavoidable in the prior art spool that the contours of each component spool are not symmetrical end for end along the axis of the component spool. Thus, it is possible and likely to improperly assemble the components of the spool resulting in a malfunction of the valve. In other words, each component of the spool has opposite ends which differ in dimensions from each other.

Figure 2:
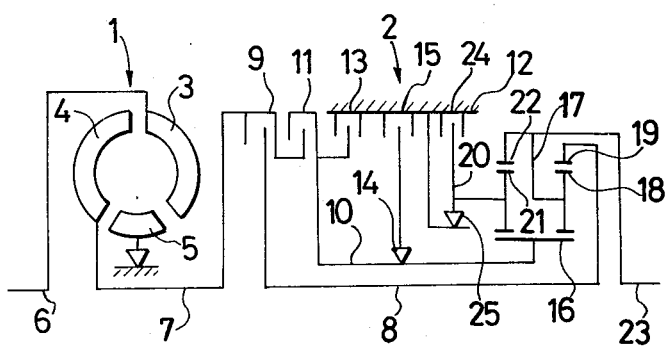
FIG. 2 is a schematic diagram of a power transmitting mechanism of an automatic transmission.

FIG. 2 is a schematic illustration of an exemplary planetary gear of a hydraulic 3-speed automatic transmission. The automatic transmission comprises a torque converter 1 and a change gear apparatus 2. The torque converter 1 is of a known type comprising a pump impeller 3, a turbine 4 and a stator 5. The pump impeller 3 is connected to the engine crank shaft 6 while the turbine 4 is connected to a turbine shaft 7. The turbine shaft functions as the output shaft of the torque converter 1 as well as the input shaft of the change gear apparatus 2, which is of a planetary gear type having three forward speed ranges and a single reverse speed range.

A multiple disc clutch 9 is interposed between the turbine shaft 7 and an intermediate shaft 8. A multiple-disc clutch 11 is interposed between the turbine shaft 7 and sun gear shaft 10. Between the sun gear shaft 10 and a transmission casing 12 is a multiple-disc brake 13. Also, between the sun gear shaft 10 and the transmission casing 12 is a one-way clutch 14 and a multiple-disc brake 15.

Two sets of planetary gear mechanisms are comprised of a sun gear 16 mounted on the sun gear shaft 10, a carrier 17, a planetary pinion 18 carried on the carrier 17, a ring gear 19 engaging with the pinion 18, another carrier 20, a planetary pinion 21 carried on the carrier 20 and a ring gear 22 engaging with the pinion 21. The ring gear 19 of one of the planetary gear mechanisms connects to the intermediate shaft 8, and the carrier 17 of the planetary gear mechanism connects to the ring gear of the other planetary gear mechanism. The carrier 17 and the ring gear 22 are connected to an output shaft 23. A multiple-disc brake 24 and a one-way clutch 25 are between the carrier 20 of the other planetary gear mechanism and the transmission casing 12.

The hydraulic automatic transmission (FIG. 2) performs automatic shifting operations for three forward speeds and one reverse speed through the engagement and releasing of the respective clutches and brakes according to vehicle speed and engine output by means of a hydraulic control circuit which is described in further detail hereinafter.

Table 1 shows the operating condition of the clutches and the brakes relative to the position of a change gear. In Table 1, symbols "o" indicate that the clutches or the brakes are in an engaged state. An "x" indicates that the clutches or the brakes are in a released state. "CL" indicates a clutch; "BR" indicates a brake and "OC" indicates a one-way clutch. "LK" indicates that the one-way clutches are in a locked state, and "OR" indicates the one-way clutches are in an over-running state.

TABLE 1

| Shift position | Frictional engagement | | | | | | |
|---|---|---|---|---|---|---|---|
| | CL 9 | CL 11 | BR 13 | BR 15 | BR 24 | OC 14 | OC 25 |
| Parking | x | x | x | x | o | | |
| Reverse | x | o | x | x | o | OR | OR |
| Neutral | x | x | x | x | x | | |
| FORWARD | | | | | | | |
| D-Range 1st | o | x | x | x | x | OR | LK |
| 2nd | o | x | x | o | x | LK | OR |
| 3rd | o | o | x | o | x | OR | OR |
| 2-Range 1st | o | x | x | x | x | OR | LK |
| 2nd | o | x | o | o | x | LK | OR |
| L-Range | o | x | x | x | o | OR | LK |

Figure 3:
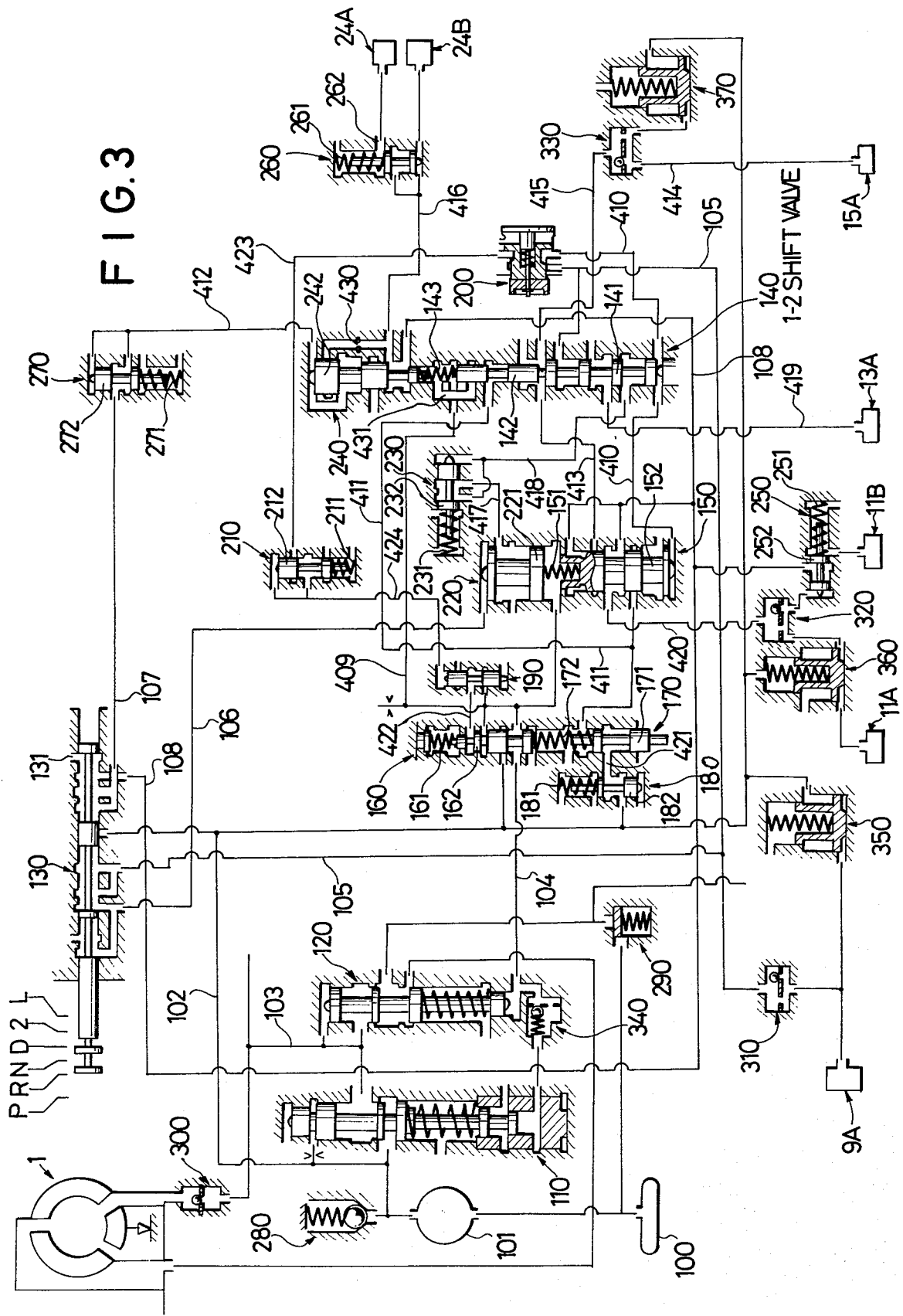
FIG. 3 is a circuit diagram of a hydraulic control system using the 1-2 shift valve for an automatic transmission in accordance with the invention.

With reference to FIG. 3, a hydraulic circuit of a hydraulic control system including a 1-2 shift valve in accordance with the invention is shown. The hydraulic control system performs automatic or manual shifting operations through the selective operation of the clutches 9,11 and brakes 13,15,24.

The hydraulic control circuit comprises an oil reservoir 100, oil pump 101, a primary regulator valve 110, secondary regulator valve 120, manual selector valve 130, a 1-2 shift valve 140 in accordance with the invention, a 2-3 shift valve 150, and a throttle valve 160. The hydraulic control circuit also includes a down-shift plug 170, detent regulator valve 180, cutback valve 190, governor valve 200, governor modulator valve 210, and an intermediate shift valve 220. Also included in the hydraulic control circuit are an intermediate modulator valve 230, low coast shift valve 240, reverse clutch sequence valve 250, reverse brake sequence valve 260, low modulator valve 270, and pressure relief valve 280. Further, the hydraulic control circuit includes a cooler by-pass valve 290, check valve 300, flow control valves 310,320,330,340 with check valves, and an accumulator 350 for allowing smooth engagement of the clutch 9, an accumulator 360 for allowing smooth engagement of the clutch 11, and accumulator 370 for allowing smooth engagement of the brake 15, and a plurality of passages connecting the valves in the respective hydraulic servomechanisms 9A,11A,11B,13A,15A,24B of the clutches and brakes.

The working fluid pumped up from the oil reservoir 100 by the oil pump 101 is adjusted to a selected line pressure by the primary regulator valve 110. The working fluid at the regulator pressure is then supplied to the passage 102. The excess of working fluid at the primary regulator valve 110 is input to the secondary regulator valve 120 through the passage 103 and in the regulator valve 120 the pressure is regulated in accordance with the throttle pressure. The throttle pressure is regulated by the throttle valve 160 and applied to the second regulator valve 120 through the passage 104 to provide a predetermined torque converter pressure, lubricating pressure and cooler pressure.

The manual selector valve 130, connected to the passage 102, is interlocked with a shift lever, not shown, so that the manual selector valve 130 is controlled to the P,R,N,D, 2 or L position corresponding to selective manual operation of the shift lever in the conventional manner. The manual selector valve 130 introduces line pressure from the passage 102 to the passages 105,106,107,108 selectively as shown in Table 2, corresponding to the shifted position of the shift lever.

TABLE 2

| Shift position | Passage 105 | Passage 106 | Passage 107 | Passage 108 |
|---|---|---|---|---|
| P | x | x | o | x |
| R | x | x | o | o |
| N | x | x | x | x |
| D | o | x | x | x |
| 2 | o | o | x | x |
| L | o | o | o | x |

In Table 2, the symbols "o" and "x" designate that the line pressure is applied to, and cut off respectively from the particular passages corresponding to the shift position of the shift lever. The symbols of the shift position are represented as follows: N is the neutral position; D is the forward four-speed automatic transmission range; 2 is the forward first and second speed automatic transmission range; and L is the forward low speed locked range. R is the reverse speed range.

The 1-2 shift valve 140 of the present invention is provided with spools 141,142. A compression spring 143 is positioned between the spool 242 of the low coast shift valve 240 and the spool 142. The 1-2 shift valve 140 is controlled by the throttle pressure applied by the throttle valve 160 through the passage 409, governor pressure applied by the governor valve 200 through the passage 410, detent pressure applied through the passages 411,431 by the down shift plug 170 and modulator pressure applied via the passage 107, modulator valve 270 and the passage 412. The 1-2 shift valve 140 controls communication of the passage 105 with the passage 413 connected to the 2-3 shift valve. The 1-2 shift valve 140 also controls communication of the passage 105 with a passage 415 connected with the hydraulic servomechanism 15A through the flow control valve 330 and a passage 414. The 1-2 shift valve 140 also controls communication of the passage 108 with a passage 416 connected to the hydraulic servomechanism 24A through the reverse brake sequence valve 260, and the communication passage 412 with the passage 416 through an orifice 430. The 1-2 shift valve 140 also controls communication of a passage 418 with a passage 419 connected with the hydraulic servomechanism 13A. The passage 418 connects to the passage 106 through the intermediate modulator valve 230 to which the working fluid is applied via the passage 106.

The 2-3 shift valve 150 is provided with a spool 152 and a compression spring 151 disposed between the spool 152 and a spool 221 of the intermediate shift valve 220. The 2-3 shift valve 150 is controlled by throttle pressure applied through a passage 409, detent pressure applied through the passage 411, governor pressure applied through the passage 410, and line pressure applied through the passage 106. The 2-3 shift valve 150 is adapted to control communications of the passage 106 with a passage 417 and the passage 413 with a passage 420 connected to the hydraulic servomechanism 11A.

The throttle valve 160 is provided with a spool 171 of the down-shift plug 170, interlocked with the accelerator pedal (not shown) and a spool 162 joined at one end thereof to the spool 171 through a spring 172, and provided with a spring 161 behind the other end thereof. The line pressure of the passage 102 is controlled corresponding to the movement of the spool 162 and is applied to the passage 409 and 104 as the throttle pressure. The communication of the passage 411 with a passage 421 connected to the passage 102 through the detent regulator valve 180, is controlled by the movement of the spool 171. The cutback pressure of the cutback valve 190 is applied to the spool 162 through a passage 422 so as to reduce the throttle pressure, whereby unnecessary power consumption by the oil pump 101 is prevented.

The cutback valve 190 is controlled by the governor pressure applied to the governor modulator valve 210 via passages 423,424 to generate the cutback pressure in the passage 422.

The governor valve 200 is mounted on the output shaft 23 and is adapted to control the line pressure applied through the passage 105 so as to generate the governor pressure which increases with an increase in the rotational speed of the output shaft. The governor pressure is applied to the passages 410,423.

The detent regulator valve 180 includes a spool 182 urged by a spring 181 from behind one end thereof, and is adapted to regulate the line pressure to generate the detent pressure which is applied to the down-shift plug 170 through the passage 421.

The low modulator valve 270 includes a spool 272 biased by a spring 271 from behind one end thereof, and is adapted to regulate the line pressure applied through the passage 107 to apply a modulated pressure to the low coast shift valve 240 through the passage 412.

The reverse brake sequence valve 260 includes a spool 262 biased by a spring 261 from behind one end thereof, and is adapted to apply the pressure applied to the passage 416 by the low coast shift valve 240 first to the hydraulic servomechanism 24B and further to the hydraulic servomechanism 24A after the pressure in the passage 416 is increased.

The reverse clutch sequence valve 250 includes a spool 252 biased by a spring 251 from behind one end thereof, and is adapted to be controlled by the pressure applied by the 2-3 shift valve through the passage 420 and the line pressure applied through the passage 108 so as to delay operation of the hydraulic servomechanism 11B relative to the operation of the hydraulic servomechanism 11A in the reverse running mode.

The intermediate modulator valve 230 includes a spool 232 biased by a spring 231 from behind one end thereof, and is adapted to regulate the line pressure applied from the passage 106 via the intermediate shift valve 220 and the passage 417 and to apply the regulated pressure to the 1-2 shift valve 140 through the passage 418.

The governor modulator valve 210 includes a spool 212 biased by a spring 211 from behind one end thereof, and is adapted to adjust the governor pressure applied by the governor valve 200 to a predetermined pressure level, and to apply the pressure to the cutback valve 190.

Operation of the hydraulic control circuit including the 1-2 shift valve 140 in accordance with the invention and constructed as described hereinabove, is now described.

When the engine is started with the manual selector valve 130 at the N-position, pressurized oil is applied to the passage 102 by operation of the oil pump 101. The primary regulator valve 110 generates line pressure in the passage 102. A portion of the pressurized and regulated oil is applied to the torque converter 1 and lubricating parts after the pressure thereof is regulated by the secondary regulator valve 120. With the manual selector valve 130 at the N-position, the line pressure is applied only to the accumulators 350,360,370 and to the throttle valve 160 and the detent regulator valve 180. The hydraulic servomechanisms 9A,11A,11B,13A,15A,24A and 24B remain idle because line pressure is not applied to the passages 105-108.

With the manual selector valve 130 at the D-position, line pressure of the passage 102 is applied to the passage 105 and to the hydraulic servomechanism 9A through the flow control valve 310 with a check valve so that the clutch 9 is engaged. Line pressure is applied also to the governor valve 200. The motor vehicle moves forward at the first speed according to the rise in the rotational speed of the engine output shaft when the accelerator pedal is pressed. At the same, the spool 171 moves correspondingly to the operation of the accelerator pedal, whereby the throttle pressure is applied to the passage 409. Governor pressure is applied to the passages 410,423 by operation of the governor valve 200 caused by the forward movement of the vehicle.

As governor pressure rises with the increase in the rotational speed of the output shaft 23, the spools 141,142 of the 1-2 shift valve 140 move upward (FIG. 3) against the throttle pressure and the force of the spring 143. Then, the passage 409 is shut off and the passage 105 communicates with the passages 415,413 such that line pressure is applied to the hydraulic servomechanism 15A via the passage 415, and the flow control valve 330 with a check valve causing the brake 15 to engage, and thus, the automatic transmission is shifted from the first speed to the second speed.

When the governor pressure rises further as the rotational speed of the output shaft 23 increases further while the vehicle is in a second-speed condition, the spool 152 of the 2-3 shift valve 150 moves upward (FIG. 3) against the throttle pressure and the force of the spring 151. Then, the spool 152 allows the passage 413 to connect with the passage 420. Consequently, the line pressure applied to the passage 413 by the 1-2 shift valve 140 is applied to the hydraulic servomechanism 11A via the passage 420 and the flow control valve 320 with check valve so that the clutch 11 is engaged. Thus, the automatic transmission is shifted from second speed to third speed.

When the accelerator pedal is pressed rapidly for kickdown operation of the automatic transmission during third speed running, the spool of the down-shift plug 170 is shifted upward to apply the detent pressure in the passage 421 to the 2-3 shift valve 150 via the passage 411. At the same, the throttle pressure corresponding to the stroke of operation of the accelerator pedal is applied to the 2-3 shift valve 150 via the passage 409. Consequently, the spool 152 of the 2-3 shift valve 150 moves downward against the governor pressure applied to the 2-3 shift valve 150 via the passage 410 so that the passage 420 is shut off from the passage 413. At the same time, the passage 420 communicates with the passage 108. As a result, pressurized oil in the hydraulic servomechanism 11A is drained through the drain port 131 of the manual selector valve 130 via the passage 420 and the passage 108, so that the clutch 11 is disengaged and the automatic transmission shifts from the third speed to the second speed.

When the accelerator pedal is pressed rapidly for kickdown operation of the automatic transmission during operation in the second speed, the spool of the down-shift plug 170 is shifted upward and detent pressure in the passage 421 is applied to the 1-2 shift valve 140 via the passage 411 while the throttle pressure, corresponding to the operational stroke of the accelerator pedal, is applied to the passage 409 which is shut off by the spool 142 of the 1-2 shift valve 140.

Consequently, the spools 141,142 of the 1-2 shift valve 140 are first moved downward by the detent pressure against the governor pressure applied through the passage 410, and then, later the throttle pressure in the passage 409 is applied so that the spools 141,142 are shifted to the lower position, (as shown in FIG. 3) whereby the passage 415 is shut off from the passage 105 and pressurized oil in the hydraulic servomechanism 15A is drained from the drain port of the 1-2 shift valve 140 via the passage 414, the flow control valve 330 with check valve and the passage 415, releasing the brake 15 so that the automatic transmission shifts from the second speed to the first speed.

With the manual selector valve 130 at the 2-position, line pressure from the passage 102 is applied to the passage 105,106. Line pressure of the passage 106 is applied to the intermediate shift valve 220 to fix the spool 221 at the lower position (FIG. 3) such that the passage 106 communicates with the passage 417 and line pressure is applied to the intermediate modulator valve 230, where line pressure is regulated and supplied to the 1-2 shift valve 140 via the passage 418.

The manner of application of pressures to the circuit in the first speed running mode is the same as that in the D-range running mode, wherein flow of the working fluid from the intermediate modulator valve 230 is shut off by the spool 141 of the 1-2 shift valve 140.

When governor pressure increases as the vehicle speed increases, spools 141,142 of the 1-2 shift valve 140 shift upward in the same manner as that of the D-position operation. Thereby, pressurized oil is supplied to the hydraulic servomechanism 15A. Also, the passage 418 is allowed to connect with the passage 419 to supply pressurized oil to the hydraulic servomechanism 13A so that the brakes 13,15 engage and the automatic transmission shifts to the second speed running mode in which engine braking is available.

In this operating mode, the automatic transmission does not shift to the third speed running mode because the spool 152 of the 2-3 shift valve 150 and the spool 221 of the intermediate shift valve 220 are biased at the respective lower positions by the line pressure of the passage 106. Accordingly, when the shift lever is positioned at the 2-position, the automatic transmission shifts between the first speed range and the second speed range, and the kickdown operation of the automatic transmission from the second speed range to the first speed range also can be attained in the manner as described above.

With the manual selector valve 130 at the L-position, line pressure of the passage 102 is applied to the passages 105,106,107. Line pressure applied to the passage 107 is regulated by the low modulator valve 270, and then is applied to the low coast shift valve 240 via the passage 412 to fix the spool 242 and the spools 141,142 of the 1-2 shift valve 140 at their respective lower positions. At the same time pressure regulated by the low modulator valve 270 is applied to the hydraulic servomechanism 24B via the passage 416. Consequently, the clutch 9 and the brake 24 engage so that the automatic transmission shifts into the first speed range in which engine braking is available.

In this operating mode, the automatic transmission is not shifted into the second speed range because the spools 141,142 of the 1-2 shift valve 140 are fixed at their respective lower positions.

Figure 4:
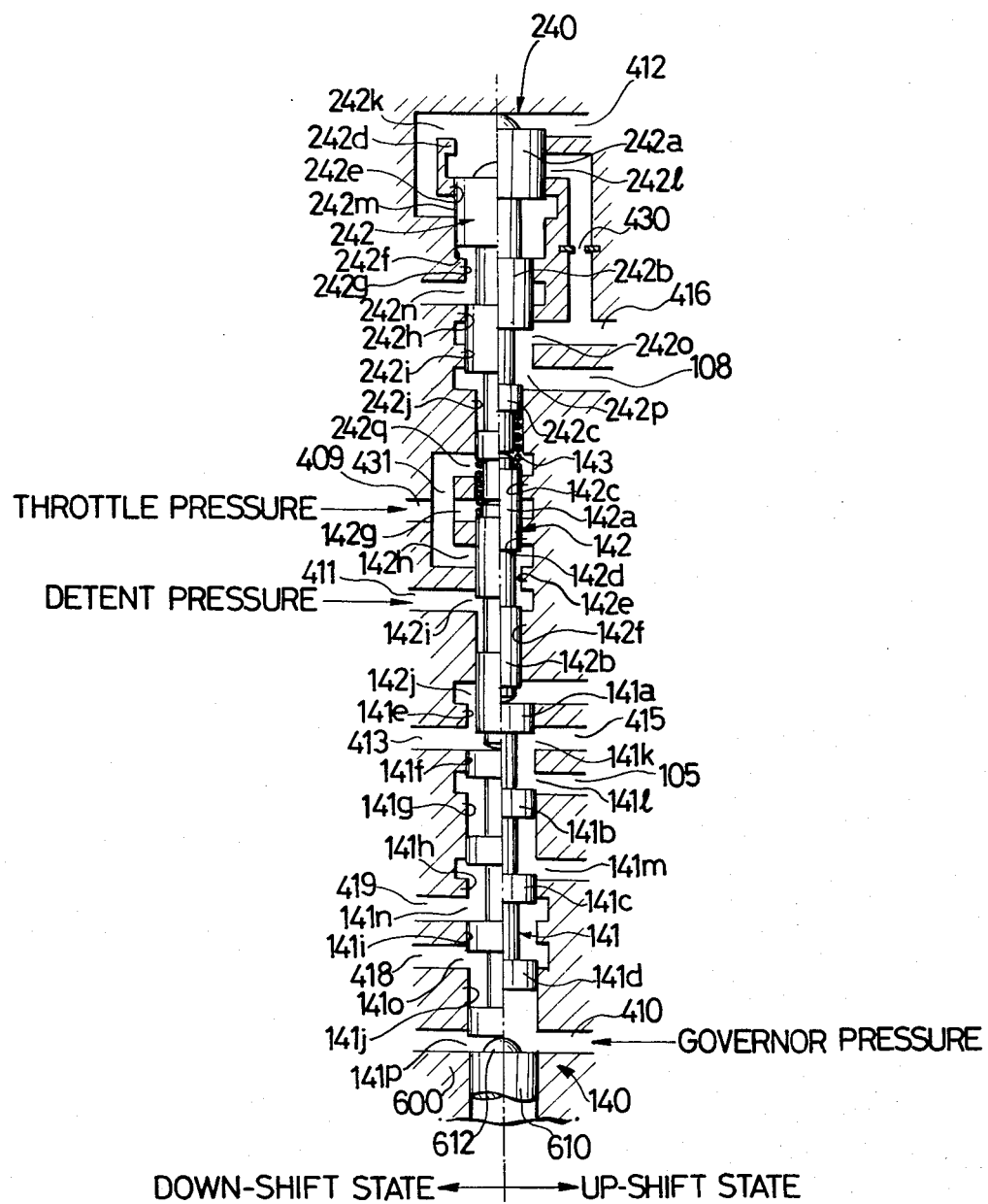
FIG. 4 is a view similar to FIG. 1 of the 1-2 shift valve for an automatic transmission in accordance with the invention.

The 1-2 shift valve for an automatic transmission in accordance with the invention is now described with more specificity with reference to FIG. 4.

The 1-2 shift valve 140 for an automatic transmission in accordance with the invention comprises a housing 600, spools 141,142, and the spool 242 of the low coast shift valve 240. The spools 141,142,242 are fitted slidably in the housing 600, coaxially and in tandem, and a spring 143 is disposed between the spools 142 and 242.

Four lands 141a,141b,141c,141d of the same diameter are formed on the spool 141. Protruding walls 141e,141f corresponding to the land 141a, a protruding wall 141g, corresponding to the land 141b, protruding walls 141h and 141i corresponding to the land 141c, and a protruding wall 141j corresponding to the land 141d are formed in the housing 600.

When the spool 141 is positioned at the up-shift position as shown in the right half of FIG. 4, the land 141a comes in contact with the protruding wall 141e. When the spool 141 is positioned at the down-shift position as shown in the left half of FIG. 4, the land 141a comes in contact with the protruding wall 141f. The land 141b is in contact with the protruding wall 141g continuously regardless of the position of the spool 141. When the spool is at the up-shift position as shown in the right half of the drawing, the land 141c comes in contact with the protruding wall 141h. When the spool 141 is at the down-shift position, the land 141c comes in contact with the protruding wall 141i. The land 141d is continuously in contact with the protruding wall 141j regardless of the position of the spool 141. Ports 141k,141l,141m,141n,141o and 141p are formed on the housing 600 between the protruding walls 141a and 141f, 141f and 141g, 141g and 141h, 141h and 141i, 141i and 141j, and below the protruding wall 141j, respectively.

On the spool 142 are formed two lands 142a and 142b of the same diameter and smaller than the diameter of the lands of the spool 141. Protruding walls 142c,142d and 142e corresponding to the land 142a, and a protruding wall 142f corresponding to the land 142b are formed in the housing 600. When the spool 142 is at the up-shift position as shown in the right half of FIG. 4, the land 142a comes in contact with the protruding wall 142c while the land 142a is in continuous contact with the protruding wall 142d regardless of the position of the spool 142. The land 142a comes in contact with the protruding wall 142e when the spool 142 is at the down-shift position as shown on the left side of the drawing (FIG. 4). The land 142b is in contact continuously with the protruding wall 142f regardless of the position of the spool 142. Ports 142g,142h,142i, and 142j are formed in the housing 600 between the protruding walls 142c and 142d, 142d and 142e, 142e and 142f, and 142f and 141e, respectively.

On the spool 242 are formed lands 242a,242b and 242c of successively reduced diameters. Protruding walls 242d,242e and 242f corresponding to the land 242a, protruding walls 242g,242h and 242i corresponding to the land 242b, and a protruding wall 242j corresponding to the land 242c are formed in the housing 600. When the spool 242 is at the up-shift position as shown in the right half of FIG. 4, the land 242a comes in contact with the protruding wall 242d. The land 242a is in contact continuously with the protruding wall 242e regardless of the position of the spool 242. The land 242a comes in contact with the protruding wall 242f when the spool 242 is at the down-shift position shown in the left half of FIG. 4. The land 242b comes in contact with the protruding wall 242g when the spool 242 is at the up-shift position shown in the right half of FIG. 4. The land 242b is in continuous contact with the protruding wall 242h regardless of the position of the spool 242. The land 242b comes in contact with the protruding wall 242i when the spool 242 is at the down-shift position shown at the left side of FIG. 4. The land 242c is in contact with the protruding wall 242j continuously regardless of the position of the spool 242.

Ports 242k,242l,242m,242n,242o,242p and 242q are formed on the housing 600, respectively, above the protruding wall 242d, between the protruding walls 242d and 242e, 242e and 242f, 242g and 242h, 242h and 242i, 242i and 242j, and 242j and 142c.

The spool 141 takes a bilateral form along its axial direction because a protrusion 612 is provided on a plug 610 in the housing 600, and no protrusion is formed on the end of the spool 141. In other words, the spool 141 is symmetrical end for end and can be inserted in the lower housing opening between the protrusion 141j with either end of the spool 141 entering first. Thereby faulty assembly of the valve is prevented with regard to the spool 141. Spool 142 also takes a bilateral form along its axial direction, that is, it is also symmetrical end for end. The spool 142 can also be inserted within the housing with either end first for this reason. There is no confusion in assembling between the spools 141 and 142 as the spool 141 has flat ends whereas the spool 142 has rounded protrusions at the ends. Also, as stated, the spool 141 is of larger diameter at the lands than is the spool 142. The spool 242 is markedly different from the other spools 141, 142, in that it has lands of decreasing diameter. Thus, the three spools 141,142,242 are readily identified on assembly and cannot be mistakenly placed in tandem in the housing 600.

Passages 412, 416, 108, 409, 411, 413, and 415, 105, 419, 418, and 410 are connected to the ports 242$k$ and 242$m$, 242$l$, and 242$o$, 242$p$, 142$g$, 142$i$, 141$k$, 141$k$, 141$l$, 141$n$, 141$o$, and 141$p$, respectively. Ports 242$n$, 142$j$ and 141$m$ are drain ports.

With the manual selector valve 130 at the D-position, the governor pressure and the throttle pressure are applied to the ports 141$p$ and 142$g$, respectively. The governor pressure is applied to the land 141$d$ so as to urge the spool 141 upward (FIG. 4). The throttle pressure is applied to the lands 242$c$ and 142$a$ urging the spool 242 upward and the spools 141 and 142 downward. While the vehicle speed is low, the spools 141 and 142 are shifted to the respective lower positions by the throttle pressure and the force of the spring 143 operating against the governor pressure so that the passage 415 is shut off from the passage 105. Even when the accelerator pedal is pressed rapidly and the detent pressure is applied to the port 142$i$, the detent pressure is not applied to the spool 142 since the ports 142$i$ and 142$h$ are separated by the land 142$a$.

When the vehicle speed is further increased, the governor pressure increases until finally the force produced by the governor pressure overcomes the force produced by the throttle pressure working with the force of the spring 143. Then, the spools 141 and 142 are moved to and located at their respective upper positions (FIG. 4 right side). Consequently, the passages 413 and 415 are allowed to communicate with the passage 105 and the line pressure in the passage 105 is applied to the hydraulic servomechanism 15A and to the 2-3 shift valve 150 so that the automatic transmission shifts into the second speed range.

The port 142$g$ to which the throttle pressure is applied is closed by the spool 142. The port 142$i$ to which the detent pressure is applied connects with the port 142$h$. Accordingly, when the accelerator pedal is pressed rapidly, the detent pressure in the port 142$i$ is applied to the land 142$a$ by way of the port 142$h$, passage 431 and port 242$q$. The force produced by the detent pressure overcomes the counterforce produced by the governor pressure so that the spools 141 and 142 are shifted to and located at the respective lower positions (FIG. 4), thus, attaining a kickdown operation of the automatic transmission to the first speed range.

When the manual selector valve 130 is positioned at the 2-postion, the control circuit operates in the manner similar to that of operation when the manual selector valve 130 is positioned at the D-position. However, the modulator pressure applied to the port 141$o$ is applied to the port 141$n$ when the spool 141 is shifted to its upper position so that the pressurized oil is supplied to the hydraulic servomechanism 13A causing the brake 13 to engage. Consequently, the automatic transmission shifts into the second speed range in which engine braking is available. In this state, when the spools 141 and 142 are shifted to the lower respective positions, as a result of kickdown operation or due to a reduction in vehicle speed, the ports 141$n$ and 141$m$ are allowed to communicate with each other and the pressurized oil, supplied to the hydraulic servomechanism 13A is drained from the port 141$n$ so that the automatic transmission shifts into the first speed range which is equivalent to the D-position.

When the manual selector valve 130 is at the L-position, modulated pressure is applied to the ports 242$k$ and 242$m$ and the pressure acts on the land 242$b$ of the spool 242 so that the spool 242 shifts downwardly. As the spool 242 is shifted downwardly, the modulated pressure is applied to the land 242$a$ after the port 242$m$ is shut off so that the spool 242 is fixed at its lower position.

On the other hand, as the spool 242 is shifted downwardly, the port 242$l$ opens and the modulated pressure is applied to the hydraulic servomechanism 24B via the passage 416. Thereby, the brake 24 is engaged so that the automatic transmission is shifted into the first-speed range in which engine braking is available.

When the governor pressure increases due to further increase in vehicle speed, the spools 141,142 and 242 remain fixed at the respective lower positions due to the difference in pressure receiving area between the land 242$a$ and the land 141$d$, as well as the pressure differential.

It is apparent from the description above that the 1-2 shift valve for an automatic transmission of the present invention has the following advantages:

(1) Reduced cost for manufacture, a simplified hydraulic circuit, improved reliability and sealing by elimination of ball check valves, and, (2) Faulty assembly prevented, reduces material cost, facilitates fabrication procedures, improves movement of the spools in the housing 600 by dividing the spool of the 1-2 shift valve into two elements 141,142 and by forming the lands of each element of the same diameter, and by forming each element in a bilateral shape along its axial direction, that is, symmetrical end for end as discussed above.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A 1-2 shift valve in a housing for an automatic transmission, said 1-2 shift valve being adapted to operate corresponding to governor pressure counteracting a throttle pressure and a detent pressure employed in a kickdown operation, said transmission being capable of shifting up from a first speed range to a second speed range as well as shifting from the second speed range to the first speed range under control of said 1-2 shift valve, comprising:

a housing; and
a spool contained within said housing, said spool comprising a first spool element and a second spool element, the first spool element having a first pressure receiving surface for receiving one of said throttle pressure and said detent pressure, said spool being actuatable between first and second speed positions in said housing, said spool when at said first speed position thereof being constructed and arranged to shut off said detent pressure from said first pressure receiving surface and to receive said throttle pressure on said first pressure receiving surface, said spool when at said second speed position thereof being constructed and arranged to shut off said throttle pressure from said first pressure receiving surface and receive said detent pressure on said first pressure receiving surface, said second spool element having a second pressure receiving surface element for receiving said governor pressure and permitting said spool to be displaced to said second speed position.

2. A 1-2 shift valve for an automatic transmission as claimed in claim 1, wherein said first spool element has a first land and a second land of the same diameter and is symmetrical end for end along its longitudinal axis.

3. A 1-2 shift valve for an automatic transmission as claimed in claim 2, wherein said second spool element is provided with a first land, second land, third land and fourth land of the same diameter, the diameter of the lands of said second spool element being greater than the diameter of the lands of said first spool element, said second spool element also being bilateral, that is, symmetrical end for end along its longitudinal axis.

4. A 1-2 shift valve for an automatic transmission as claimed in claim 2 or 3, wherein said first and second spool elements are supported in contact end to end in said housing and said two spool elements move in unison.

5. A 1-2 shift valve for an automatic transmission as claimed in claim 4, wherein said first pressure receiving surface is at the non-contacting end of said first spool element.

6. A 1-2 shift valve for an automatic transmission as claimed in claim 5, wherein said second pressure receiving surface is at the non-contacting end of said second spool element.

7. A 1-2 shift valve for an automatic transmission as claimed in claim 4, wherein said second pressure receiving surface is at the non-contacting end of said second spool element.

8. A 1-2 shift valve as claimed in claim 1, wherein said second pressure receiving surface is at the non-contacting end of said second spool element.

9. A 1-2 shift valve as claimed in claim 1, wherein said first pressure receiving surfaces at the non-contacting end of said first spool element.

10. A 1-2 shift valve as claimed in claim 1, wherein said first and second spool elements are supported in contact end to end in said housing and said two spool elements move in unison.

11. A 1-2 shift valve as claimed in claim 1, further including biasing means for biasing the spool against the governor pressure.

12. A 1-2 shift valve as claimed in claim 11, wherein the biasing means is a spring positioned within the housing coaxial with the spool and in contact with said first pressure receiving surface.

13. A 1-2 shift valve as claimed in claim 1, said spool further comprising a third spool element adapted to maintain said spool in the first speed position.

14. A 1-2 shift valve in a housing for an automatic transmission, said 1-2 shift valve being adapted to operate corresponding to a governor pressure counteracting a throttle pressure and a detent pressure employed in a kickdown operation, said transmission being capable of shifting up from the first speed range to a second speed range as well as shifting down from the second speed range under control of said 1-2 shift valve, comprising:

a spool slidably fitted in said housing with respect to the longitudinal direction thereof and being actuatable between first and second speed positions;

at least a first land, a second land, a third land and a fourth land formed on said spool, spaces existing between the lands in the longitudinal direction, the first land and the second land having the same first diameter and the third land and the fourth land having the same second diameter, said first land having a second pressure receiving surface and said fourth land having a first pressure receiving surface;

a first port formed on said housing for applying the governor pressure to said second pressure receiving surface for actuating said spool toward the second speed position;

a second port formed on said housing for applying a signal to provide the second speed range when said spool is positioned in the second speed position and not providing said signal when said spool is positioned in the first speed position said signal being interrupted by the second land;

a third port formed on said housing adapted to apply the detent pressure to the first pressure receiving surface to actuate said spool toward the first speed position when said spool is positioned in the second speed position;

a fourth port formed on said housing adapted to apply the throttle pressure to the first pressure receiving surface to actuate said spool toward the first speed position when said spool is positioned in said first position, said fourth port being closed by said fourth land when said spool is positioned in the second speed position; and a fifth port, a sixth port and a passage for connecting said fifth port and said sixth port, all formed on said housing, said fifth port being communicated with said third port for applying the detent pressure to said first pressure receiving surface via said passage and said sixth port when said spool is positioned in the second speed position and said communication via said passage and said sixth port being closed by said fourth land when said spool is positioned in the first speed position.

15. A 1-2 shift valve as claimed in claim 14, wherein said spool includes a first spool element and a second spool element disposed coaxially and in tandem with respect to the longitudinal direction, said first spool element having said first land and said second land and said second spool element having said third land and said fourth land.

16. A 1-2 shift valve as claimed in claim 15, wherein said first and second spool elements are supported in contact end to end in said housing and said two spool elements move in unison.

17. A 1-2 shift valve as claimed in claim 15, wherein said first and second spool elements are bilateral, that is, symmetrical end to end along their longitudinal axes, respectively.

18. A 1-2 shift valve as claimed in claim 16, wherein said first and second spool elements are bilateral, that is, symmetrical end to end along their longitudinal axes, respectively.

19. A 1-2 shift valve as claimed in claim 14, further comprising a spring for moving said spool toward the first speed position against the governor pressure.

20. A 1-2 shift valve as claimed in claim 15, further comprising a spring for moving said spool toward the first speed position against the governor pressure.

21. A 1-2 shift valve as claimed in claim 16, further comprising a spring for moving said spool toward the first speed position against the governor pressure.

22. A 1-2 shift valve as claimed in claim 17, further comprising a spring for moving said spool toward the first speed position against the governor pressure.

23. A 1-2 shift valve for an automatic transmission as claimed in claim 18, further comprising a spring for moving said spool toward the first speed position against the governor pressure.

24. A 1-2 shift valve as claimed in claim 14, wherein the diameter of said third and fourth lands is smaller than the diameter of said first and second lands.

25. A 1-2 shift valve as claimed in claim 15, wherein the diameter of said third and fourth lands provided on said second spool element is smaller than the diameter of said first and second lands provided on said first spool element.

26. A 1-2 shift valve as claimed in claim 16, wherein the diameter of said third and fourth lands provided on said second spool element is smaller than the diameter of said first and second lands provided on said first spool element.

27. A 1-2 shift valve as claimed in claim 17, wherein the diameter of said third and fourth lands provided on said second spool element is smaller than the diameter of said first and second lands provided on said first spool element.

28. A 1-2 shift valve as claimed in claim 18, wherein the diameter of said third and fourth lands provided on said second spool element is smaller than the diameter of said first and second lands provided on said first spool element.

* * * * *